United States Patent
Kim et al.

(10) Patent No.: US 12,427,478 B2
(45) Date of Patent: Sep. 30, 2025

(54) FEED SPACER HAVING THREE-LAYERED STRUCTURE AND REVERSE OSMOSIS MEMBRANE FILTER MODULE COMPRISING SAME

(71) Applicant: LG CHEM, LTD., Seoul (KR)

(72) Inventors: Taehyeong Kim, Daejeon (KR); Taeyoung Park, Daejeon (KR); Se Jeong Hwang, Daejeon (KR); Phill Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 400 days.

(21) Appl. No.: 18/014,864

(22) PCT Filed: Feb. 16, 2022

(86) PCT No.: PCT/KR2022/002270
§ 371 (c)(1),
(2) Date: Jan. 6, 2023

(87) PCT Pub. No.: WO2022/177284
PCT Pub. Date: Aug. 25, 2022

(65) Prior Publication Data
US 2023/0285901 A1 Sep. 14, 2023

(30) Foreign Application Priority Data
Feb. 16, 2021 (KR) .................. 10-2021-0020423

(51) Int. Cl.
*B01D 61/02* (2006.01)
*B01D 61/08* (2006.01)
(Continued)

(52) U.S. Cl.
CPC .......... *B01D 61/10* (2013.01); *B01D 61/025* (2013.01); *B01D 61/08* (2013.01); *B01D 65/08* (2013.01); . *C02F 1/441* (2013.01); *B01D 2313/143* (2013.01)

(58) Field of Classification Search
CPC . B01D 61/10; B01D 63/103; B01D 2313/143
See application file for complete search history.

(56) References Cited

U.S. PATENT DOCUMENTS 7,459,082 B2 12/2008 Tung et al.
2003/0205520 A1 11/2003 Johnson
(Continued)

FOREIGN PATENT DOCUMENTS

JP H10-309445 11/1998
JP 2004-283708 10/2004
(Continued)

OTHER PUBLICATIONS

Jizo Shinichi et al—JP 2005-305422 A espacenet translation (Year: 2005).*
(Continued)

*Primary Examiner* — Bradley R Spies
(74) *Attorney, Agent, or Firm* — Bryan Cave Leighton Paisner LLP (57) ABSTRACT

Provided is a feed spacer having a three-layered structure, and a reverse osmosis membrane filter module including the same, where the feed spacer includes a first set of a plurality of strands that are positioned in parallel; a second set of a plurality of parallel strands provided to cross the first set; and a third set of a plurality of parallel strands positioned in parallel with a raw water flow direction, where at least one of the first set and the second set consists of strands having a smaller thickness than that of the strands constituting the third set.

7 Claims, 3 Drawing Sheets

(51) Int. Cl.
    *B01D 61/10*    (2006.01)
    *B01D 65/08*    (2006.01)
    *C02F 1/44*     (2023.01)

(56) References Cited

U.S. PATENT DOCUMENTS

| | | |
|---|---|---|
| 2004/0182774 A1 | 9/2004 | Hirokawa et al. |
| 2010/0108593 A1 | 5/2010 | Chikura et al. |
| 2015/0314231 A1 | 11/2015 | Bowen et al. |
| 2019/0111396 A1 | 4/2019 | Kidwell |
| 2020/0086276 A1 | 3/2020 | Lee et al. |

FOREIGN PATENT DOCUMENTS

| | | | | |
|---|---|---|---|---|
| JP | 2005305422 A | * | 11/2005 | ............. B01D 63/10 |
| JP | 2015-526282 | | 9/2015 | |
| KR | 10-2007-0031279 | | 3/2007 | |
| KR | 10-0976074 | | 8/2010 | |
| KR | 10-2015-0036192 | | 4/2015 | |
| KR | 10-2019-0031715 | | 3/2019 | |
| KR | 10-2019-0044270 | | 4/2019 | |
| KR | 10-2157928 | | 9/2020 | |
| WO | 2004-112945 | | 12/2004 | |
| WO | WO-2019078604 A1 | * | 4/2019 | ........... B01D 61/025 |

OTHER PUBLICATIONS

International Search Report and the Written Opinion of PCT/KR2022/002270, mailed Jun. 9, 2022.
Li et al. "Novel spacers for mass transfer enhancement in membrane separations," Journal of Membrane Science 253 (2005) 1-12.
Johnson et al., "Engineering aspects of reverse osmosis module design," Desalination and Water Treatment, 15(1-3):236-248 (2010).

* cited by examiner

FEED SPACER HAVING THREE-LAYERED STRUCTURE AND REVERSE OSMOSIS MEMBRANE FILTER MODULE COMPRISING SAME

CROSS-REFERENCE TO RELATED APPLICATION(S)

This application is a National Stage Application of International Application No. PCT/KR2022/002270 filed on Feb. 16, 2022, which claims priority to and the benefit of Korean Patent Application No. 10-2021-0020423 filed in the Korean Intellectual Property Office on Feb. 16, 2021, the entire contents of which are incorporated herein by reference.

TECHNICAL FIELD

The present invention relates to a feed spacer having a three-layered structure and a reverse osmosis membrane filter module including the same.

BACKGROUND

As water shortages due to global warming intensify around the world, a water purification technology, which is an alternative water resource securing technology, has attracted attention.

Therefore, it is expected that a water treatment process using a reverse osmosis membrane, which is a core technology of the next-generation water supply business using alternative water resources such as seawater desalination and water reuse, will lead the water industry market.

The reverse osmosis membrane permeated water produced by the reverse osmosis membrane becomes pure water or water close to infinitely pure water, and has been used in various fields such as sterile water for medical use, purified water for population dialysis, or water for manufacturing semiconductors in the electronics industry.

Here, the reverse osmosis is called an osmosis phenomenon, in which two solutions having a difference in concentration are separated by a semi-permeable membrane, and after a certain period of time, while a solution having a lower concentration moves to a higher concentration, a constant water level difference is generated. In addition, the difference in water level that occurs during this process is called reverse osmosis. A device that purifies water by passing only water molecules through a semi-permeable membrane using this principle is called reverse osmosis equipment, and the semi-permeable membrane that is input in the reverse osmosis equipment is a reverse osmosis filter module.

The reverse osmosis filter module is configured to include a central tube, a feed spacer, a reverse osmosis (RO) membrane, a tricot filter channel, and the like.

Among them, the feed spacer mainly uses a diamond-shaped spacer, and serves as a passage through which raw water is introduced.

On the other hand, concentration polarization inevitably occurs in the vicinity of the reverse osmosis membrane due to the water permeation flux, and as this phenomenon becomes more severe, the osmotic pressure increases near the reverse osmosis membrane and the water permeability decreases.

At this time, the feed spacer not only secures a flow path between the separation membranes, but also generates a turbulent flow in the raw water flow to alleviate the concentration polarization occurring near the reverse osmosis membrane.

However, this turbulent flow causes a differential pressure and obstructs the flow to cause the accumulation of foulants suspended in the supplied raw water. As a result, cleaning cycles for removal of the accumulation of foulants may be increased. Since such cleaning results in an increase in cost, the lower the differential pressure, the higher the efficiency of the reverse osmosis filter module.

Therefore, there is a need for a feed spacer capable of increasing the efficiency of the reverse osmosis filter module by reducing the generation of differential pressure and decreasing the concentration polarization.

PRIOR ART DOCUMENTS

Korean Patent Registration No. 10-0976074

BRIEF DESCRIPTION

Technical Problem

In order to solve the above problems, an object of the present invention is to provide a feed spacer structure having a three-layered structure having strands of different thickness and a reverse osmosis membrane filter module including the same.

Technical Solution

According to an aspect of the present invention, provided is a feed spacer having a three-layered structure including a first set in which a plurality of strands is positioned in parallel; a second set of a plurality of parallel strands which is provided to cross the first set; and a third set of a plurality of parallel strands which is positioned in parallel with a raw water direction, wherein at least one of the first set and the second set consists of strands having a smaller thickness than that of the strands constituting the third set.

According to another aspect of the present invention, provided is a reverse osmosis filter module including the feed spacer having the three-layered structure described above.

Advantageous Effects

According to the present invention, the feed spacer has an effect of minimizing the pressure loss by suppressing the occurrence of turbulent flow of raw water.

According to the present invention, the feed spacer suppresses the accumulation of foulants, thereby increasing the efficiency of the reverse osmosis filter module.

EXPLANATION OF REFERENCE NUMERALS AND SYMBOLS

100: Feed spacer
200: Reverse osmosis membrane
300: tricot permeate channel
400: Tube including opening for accommodating permeate
10, A: First set (diagonal line)
20, C: Second set (diagonal line)
30, B: Third set (center line)

DETAILED DESCRIPTION

Hereinafter, the present invention will be described in detail so as to easily enable those skilled in the art to practice the present invention. However, the present invention can be embodied in various different forms and are not limited only to configurations described herein.

In this specification, unless explicitly described to the contrary, a case where any part "includes" any component will be understood to imply the inclusion of stated components but not the exclusion of any other component.

<Feed Spacer>

According to an embodiment of the present invention, provided is a feed spacer having a three-layered structure including a first set in which a plurality of strands is positioned in parallel, a second set of a plurality of parallel strands which is provided to cross the first set, and a third set of a plurality of parallel strands which is positioned in parallel with a raw water direction, wherein at least one of the first set and the second set consists of strands having a smaller thickness than that of the strands constituting the third set.

As used herein, the "positioned in parallel" means that a plurality of strands constituting the same set are spaced apart or separated from each other so as not to cross each other. It can be confirmed from a top view measured using a microscope (Device name: Dino-Lite Premier AM7013MZT, Manufacturer: Dino-lite).

Figure 3:
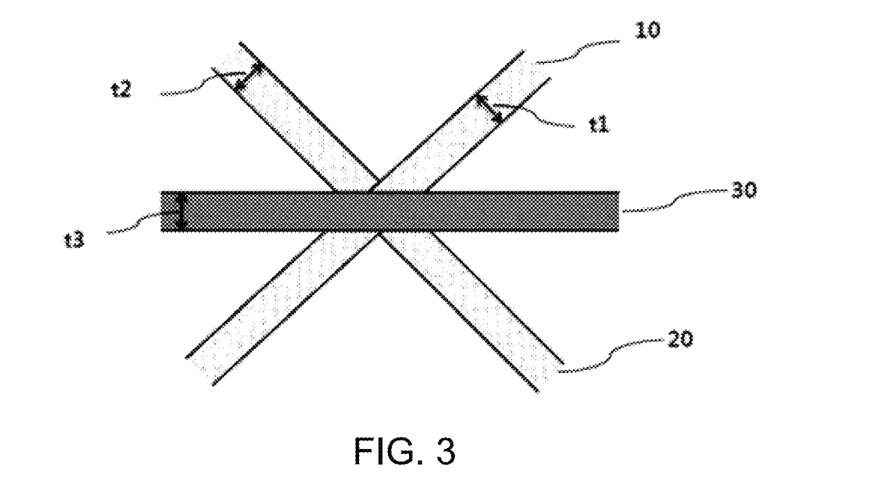
FIG. 3 is an enlarged view of a part of the top view of the feed spacer having the three-layered structure according to an embodiment of the present invention of FIG. 2A.

In this specification, the "thickness of the strand" means an average thickness of strands consisting of each set, and a value obtaining a size of the thickness from the top view measured using the microscope (Device name: Dino-Lite Premier AM7013MZT, Manufacturer: Dino-lite). Specifically, the thickness can refer to widths t1, t2, and t3 of the strands observed from the top view as illustrated in FIG. 3. That is, comparing the size of the thickness means comparing the average thickness of the strands constituting each set. Accordingly, in the present specification, the "same thickness" means that the average thickness of the strands constituting each set is the same. The deviation in thickness can be preferably ±0.050 mm or less.

Figure 2A:
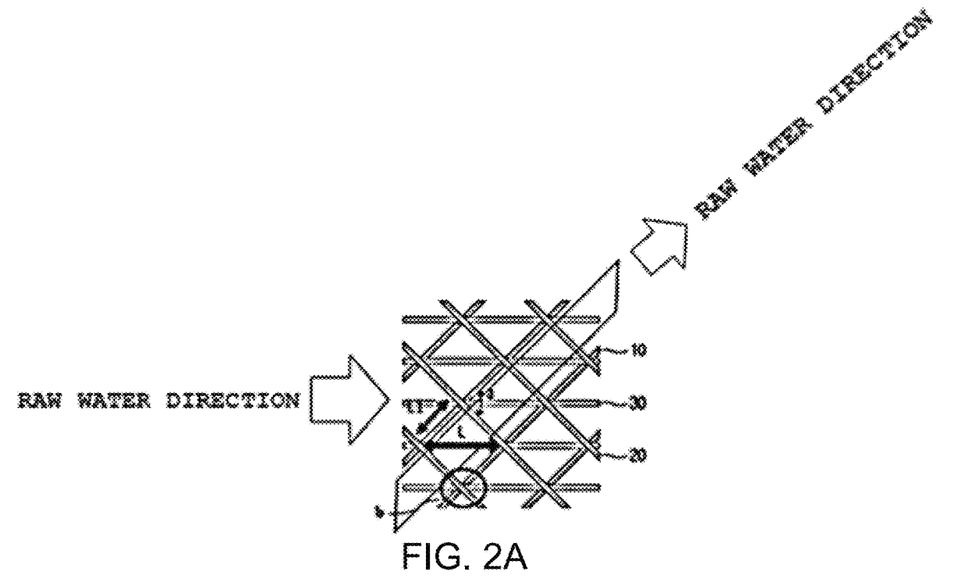
FIG. 2A is a top view of a feed spacer having a three-layered structure according to an embodiment of the present invention.

In the present specification, "SPI" is an abbreviation of strand per inch, which means the number of strands per unit length when 1 inch (2.54 cm) is a unit length, and can be referred to as "the number of strands per unit length". More specifically, the SPI means the total number of strands constituting each set within 1 inch of unit length in the flow path direction of the feed spacer, and can be measured by counting strands per inch from the top view measured using the microscope (Device name: Dino-Lite Premier AM7013MZT, Manufacturer: Dino-lite) or calculated by dividing a 1-inch distance by a distance (L1 of FIG. 2) to an intersection from one strand measured by the microscope. The deviation in SPI can be preferably ±1 or less.

The strand per inch (SPI) of the feed spacer according to the present invention can be 4 to 9, preferably 4 to 6. In other words, a distance L between the intersections formed by crossing the first set 10 and the second set 20 can be 3,800 µm to 12,000 µm.

Figure 2B:
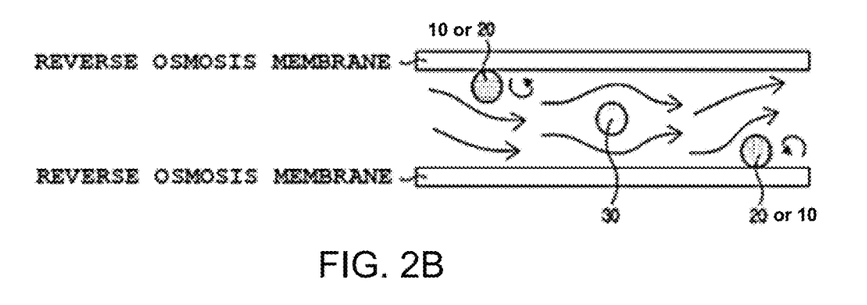
FIG. 2B is a cross-sectional view of a reverse osmosis filter module of which reverse osmosis membranes are positioned on one side and the other side of the feed spacer having the three-layered structure according to an embodiment of the present invention.

FIG. 2A is a top view of a feed spacer having a three-layered structure according to an embodiment of the present invention, and FIG. 2B is a cross-sectional view of a reverse osmosis filter module of which reverse osmosis membranes are positioned on one side and the other side of the feed spacer having the three-layered structure according to an embodiment of the present invention.

The feed spacer according to the present invention can consist of a first set 10, a second set 20, and a third set 30 in which a plurality of strands in each set is positioned in parallel.

In addition, as can be seen in FIG. 2, the first set 10 and the second set 20 are positioned to be inclined to the raw water flow direction based on the raw water flow direction, which can be referred to as diagonal lines, respectively, and the third set 30 is positioned in parallel to the raw water flow direction based on the raw water flow direction, which can be referred to as a center line.

When the third set (or center line) does not exist, at a low SPI value, the feed spacer may not support the space between the separation membranes used in the manufacture of the reverse osmosis filter module. When such a case occurs, there may be a problem that the cross-sectional area of the flow path in the flow direction is reduced by the actual thickness of the feed spacer to increase the differential pressure. On the other hand, the feed spacer according to the present invention in which the third set (or center line) is present can support between the separation membranes used in the manufacture of the reverse osmosis filter module even at a relatively low SPI value due to the third set (or center line), so that it is effective in preventing the problem of increasing differential pressure (Reference: Engineering aspects of reverse osmosis module design, Jon Johnson & Markus Busch, Dow Water & Process Solutions, Liquid Separations Application Development Laboratory Published online: 3 Aug. 2012, Desalination and Water Treatment 15(1-3): 236-248 (2010)).

In the first set 10 and the second set 20, one or more or a plurality of strands can be positioned in parallel with each other, wherein the strands can be positioned to be inclined in the raw water direction. In addition, the second set 20 can be positioned to cross the first set 10. In addition, the second set 20 can be positioned in a direction opposite to the inclined direction of the first set 10 so that the first set 10 and the second set 20 can be provided in a grid shape.

The third set 30 can have one or more or a plurality of strands positioned in parallel, where the strands can be positioned parallel to the raw water direction.

In addition, the first set 10 can be positioned at a slope of 10° to 80° based on the flow direction of the raw water, and the second set 20 can be positioned at a slope of 100° to 170° based on the flow direction of the raw water. In addition, an angle a between the first set 10 and the second set 20 can be formed in the range of 50° to 90°, preferably 70° to 85°. The in-between angle refers to a part a of FIG. 2.

For example, if the strands constituting the first set 10 are inclined at 60° with respect to the flow direction of raw water, the strands of the second set 20 can be positioned to be inclined at 150° to 170° with respect to the flow direction of the raw water.

In addition, when the angle between the first set 10 and the second set 20 is 50°, when the strands constituting the first set 10 are formed to be inclined at 30° with respect to the flow direction of the raw water, the strands of the second set 20 can be positioned to be inclined at 160° with respect to the flow of raw water.

At this time, when the angle between the first set 10 and the second set 20 is less than 50°, as the distance from the third set 30 to be described below becomes smaller, the cross-sectional area of the flow path formed by the strands decreases, so that there may be a problem that a polarization phenomenon increases because a laminar flow velocity gradient does not occur in the central part of the feed spacer. When the angle between the first set 10 and the second set 20 is more than 90°, as the distance from the third set 30 increases, the cross-sectional area of the flow path increases, so that there may be a problem that the flow of raw water actively occurs in a vertical direction and the pressure loss increases. Here, the flow path is formed by the strands constituting each set, and can refer to an empty space between the reverse osmosis membranes positioned above and below the feed spacer and each set.

The third set 30 according to the present invention can be positioned in parallel to the flow direction of the raw water, and can be positioned between the first set 10 and the second set 20 or at the top of the three sets. That is, the third set 30 can be positioned on one of the one side of the first set 10 and one side of the second set 20. In more detail, when the second set 20 is positioned above the first set 10 in the set stacking order, the third set 30 can be positioned on one side, that is, an upper portion of the second set 20. In addition, when the first set 10 is positioned above the second set 20 in the set stacking order, the third set 30 can be positioned above the first set 10.

First, referring to FIG. 2B, when the third set 30 is positioned on one side of the first set 10 and the other side of the second set 20, the feed spacer can consist of a set which is in direct contact with the reverse osmosis membrane and a set which is not in contact with the reverse osmosis membrane. In more detail, the third set 30 is not in direct contact with the reverse osmosis membrane, and the first set 10 and the second set 20 are in contact with the reverse osmosis membrane.

The first set 10 and the second set 20 can be in contact with the reverse osmosis membrane and serve to support the feed spacer structure, and can periodically convect the interfacial flow of raw water between the reverse osmosis membranes to the center of the feed spacer structure. That is, the feed spacer according to the present invention convects the interfacial flow of raw water to the third set 30, so that the third set 30 can generate a laminar flow velocity gradient of the interfacial flow to reduce the polarization phenomenon.

In addition, as illustrated in FIG. 2A, the feed water can flow in a diagonal direction from the flow direction of the feed water.

In addition, the third set 30 can be provided at an intersection between the first set 10 and the second set 20 or at any one of 1/5 to 4/5 points between the intersections.

The feed spacer according to the present invention can be manufactured by a fusion bonding method. The feed spacer can be manufactured by extruding the first set 10, the second set 20 and the third set 30 in a bonded state, or extruding the first set 10 and the third set 30 or the second set 20 and the third set 30 in a bonded state and then laminating and bonding the second or first set.

The spacing between the strands forming the first to third sets 10, 20, and 30 according to the present invention can be 4 mm to 12 mm. Here, when the spacing between the strands is less than 4 mm, the turbulent flow of raw water can occur more than necessary, resulting in an increase in pressure loss. In addition, when the spacing between the strands is more than 12 mm, a section in which the vertical flow of raw water does not occur is generated to cause a problem in that a laminar flow velocity gradient does not occur. In addition, since it is not possible to support between the separation membranes, the cross-sectional area of the flow path in the flow direction is reduced, which can cause a problem in which the differential pressure is increased.

In an embodiment of the present invention, provided is a feed spacer having a three-layered structure, in which one of the first set and the second set consists of strands having a thickness smaller than that of the strands constituting the third set, and the other thereof consists of strands having the same thickness as that of the strands constituting the third set.

In an embodiment of the present invention, provided is a feed spacer having a three-layered structure, in which both the first set and the second set consist of strands having a thickness smaller than that of the strands constituting the third set.

In an embodiment of the present invention, a ratio of the thickness of the strands constituting the third set and the thickness of the strands having a thickness smaller than the thickness of the strands constituting the third set is 1.1 to 1.5:1, preferably 1.1 to 1.4:1. This means that the strands constituting the third set are 1.1 to 1.5 times, preferably 1.1 to 1.4 times thicker than the strands having a smaller thickness than the strands constituting the third set.

That is, the strands constituting the third set can be expressed as strands having a large thickness. In other words, in an embodiment of the present invention, the ratio of the thickness of the strands having the large thickness and the thickness of the strands having the small thickness is 1.1 to 1.5:1, preferably 1.1 to 1.4:1. This means that the thickness of the strands having the large thickness is 1.1 times to 1.5 times, preferably 1.1 times to 1.4 times thicker than that of the strands having the small thickness.

In an embodiment of the present invention, the thickness of the strands having the small thickness can be provided in the range of 150 μm to 190 μm.

In an embodiment of the present invention, the thickness of the strands constituting the third set can be provided in the range of 205 μm to 385 μm.

In an embodiment of the present invention, the thickness of the strands having the large thickness can be provided in the range of 205 μm to 385 μm.

In addition, in an embodiment of the present invention, the thickness of the feed spacer can be 600 μm to 900 μm.

When the thickness of the strands constituting each set is less than 150 μm, a phenomenon in which the strands are broken occurs, thereby limiting the manufacture of the feed spacer, and when the thickness of the feed spacer is less than 600 μm, there may be a problem that the feed spacer structure may not be supported.

In addition, when the thickness of the strands is more than 300 μm and the thickness of the feed spacer is more than 900 μm, it is necessary to reduce the thickness of the separation membrane or tricot used in the manufacture of the reverse osmosis filter module, so that there may be problems of deteriorating the stability of the reverse osmosis filter module using such a feed spacer and reducing the flow rate of the reverse osmosis filter module.

By satisfying the thickness of the strands constituting the feed spacer according to the present invention, the occurrence of turbulence can be suppressed, thereby reducing the pressure loss of the fluid. In addition, it is possible to secure a void fraction and an effective membrane area of a channel through which the raw water can flow, so that it is possible to improve the physical properties of produced water as well as to improve the differential pressure.

The strand per inch (SPI) of the feed spacer according to the present invention can be 4 to 9, preferably 4 to 6. In other words, a distance L between the intersections formed by crossing the first set 10 and the second set 20 can be 3,800 μm to 12,000 μm. Here, the strand per inch (SPI) can mean the number of strands corresponding to one side of the flow path per inch. That is, the SPI can mean the number of strands between the intersections formed by crossing the first set 10, the second set 20, and the third set 30 each other.

When the SPI is less than 4 and the distance between the intersections is more than 12,000 μm, the cross-sectional area of the flow path decreases and a laminar flow velocity gradient does not occur at the center of the feed spacer, which can cause a problem in that the polarization phenomenon increases. When the SPI is more than 9 and the distance between the intersections is less than 3,800 μm, the cross-sectional area of the flow path increases and the flow of raw water actively occurs in the vertical direction, which can cause a problem in that the pressure loss increases.

In addition, when the SPI is less than 4, even the feed spacer according to the present invention having a center line may not support the spaces between the separation membranes used in the manufacture of the reverse osmosis filter module. When such a case occurs, there may be a problem that the cross-sectional area of the flow path in the flow direction is reduced by the actual thickness of the feed spacer to increase the differential pressure (Reference: Engineering Aspects of Reverse Osmosis Module Design, Jon Johnson & Markus Busch, Dow Water & Process Solutions, Liquid Separations Application Development Laboratory Published online: 3 Aug. 2012, Desalination and Water Treatment 15(1-3): 236-248 (2010)).

In the present specification, the "slope of the strand" and "in-between angle" can be confirmed from a top view measured using a microscope (Device name: Dino-Lite Premier AM7013MZT, Manufacturer: Dino-lite) (see FIG. 2A). That is, it is possible to measure the slope and the angle between the strands based on the center line shown in the top view.

As used herein, the "thickness of the feed spacer" refers to the distance between one surface and the other surface of the feed spacer based on the vertical direction of the raw water flow. The thickness of the feed spacer was measured by using an ABS Digimatic digital indicator (Mitutoyo Corp., Model name: ID-C125XB product), and when setting a zero point for measurement, a condition of 1 inch (25.4 mm) of a foot size (diameter) was used under a weight load of 10 oz (284 g).

<Reverse Osmosis Filter Module>

In an embodiment of the present invention, provided is a reverse osmosis filter module including the feed spacer having the three-layered structure according to the present invention described above. In addition, the reverse osmosis filter module can include a tube including an opening in which a permeate is accommodated along a longitudinal direction; and one or more reverse osmosis membranes which extend in an outer direction from the tube and wound around the tube, and the feed spacer can be in contact with the one or more reverse osmosis membranes and wound around the tube.

Figure 1:
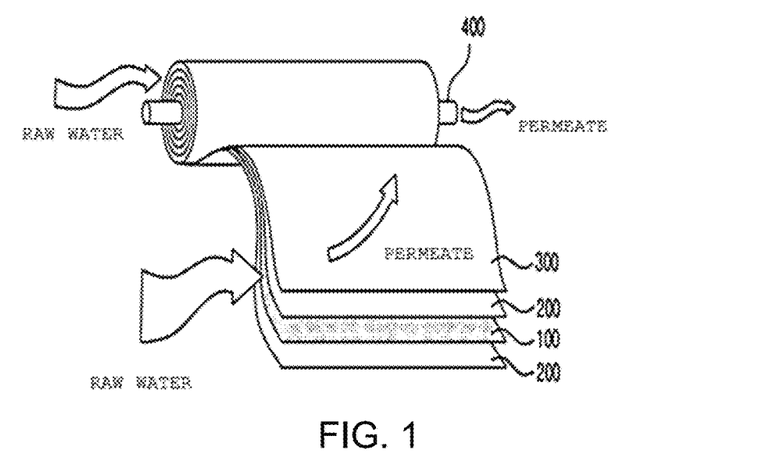
FIG. 1 is a perspective view of a reverse osmosis filter module according to an embodiment of the present invention.

FIG. 1 is a perspective view of a reverse osmosis filter module according to an embodiment of the present invention. The reverse osmosis filter module is a component of a membrane separation device that serves to purify water to be actually supplied using a reverse osmosis principle. The reverse osmosis filter module can include a reverse osmosis membrane 200, a feed spacer 100, a tricot permeate channel 300, and a tube 400 including an opening for accommodating a permeate along the longitudinal direction. In addition, a pair of telescoping prevention devices (not illustrated) can be further included, but a detailed description thereof will be omitted.

The one or more reverse osmosis membranes 200 serve to filter foreign substances contained in water using an osmosis phenomenon and simultaneously serve as a flow path so that purified water flows effectively. These one or more reverse osmosis membranes extend from the tube in the outer direction and are wound around the tube.

The feed spacer 100 can be provided with the feed spacer 100 according to the present invention described above. In more detail, the feed spacer 100 can be provided in a three-layered structure, where the three layers refer to a structure in which three strands constituting the feed spacer 100 are stacked and a plurality of strands are positioned in parallel with each other to configure a one-layered set and three sets are stacked.

The feed spacer 100 is provided in the three-layered structure, and can be divided into a set in contact with the reverse osmosis membrane 200 and a set not in contact with the reverse osmosis membrane 200.

In an embodiment, the first and second sets can be in contact with one or more reverse osmosis membranes 200, and the third set is not in contact with one or more reverse osmosis membranes 200. The set in contact with the reverse osmosis membrane 200 can convect the flow direction of the raw water supplied to the reverse osmosis filter module to the center of the feed spacer 100, that is, the set not in contact with the reverse osmosis membranes 200.

Accordingly, a laminar flow velocity gradient occurs in a portion where the set not in contact with the reverse osmosis membrane 200 is positioned, and turbulent convection occurs locally only in the portion where the set is in contact with the reverse osmosis membrane 200 to reduce the polarization phenomenon of the feed spacer 100 and reduce the pressure loss, thereby further increasing the efficiency of the reverse osmosis filter module.

The feed spacer 100 forms a passage through which raw water is introduced from the outside, and serves to maintain a distance between one reverse osmosis membrane 200 and the other reverse osmosis membrane 200. To this end, the feed spacer 100 is configured to be in contact with the one or more reverse osmosis membranes 200 at the upper and lower sides and to be wound around the tube like the one or more reverse osmosis membranes 200.

At this time, there can be a case in which some of raw water flows inside or outside the feed spacer 100 from the outside of the feed spacer 100 configured to be wound around the tube. Referring to FIG. 2, in this case, when the third set 30 is positioned on one side of the second set 20, the third set 30 positioned at the top is in parallel to the flow direction of the raw water to serve to separate the flow in half. Therefore, the first set 10 in direct contact with the reverse osmosis membrane convects the interface flow of the raw water to the second set 20, and the third set 30 separates the raw water in half and convects the raw water to the second set 20 so that the convention occurs periodically near the interface of the reverse osmosis membrane, thereby minimizing the pressure loss of the feed spacer according to the present invention.

Here, a material of the feed spacer 100 is not particularly limited, but preferably consists of any one of polyethylene, polyvinyl chloride, polyester, polypropylene, and mixtures thereof.

The tricot permeate channel 300 generally has a structure in the form of a fabric, and serves as a flow path for creating a space through which water purified through the reverse osmosis membrane 200 can flow out.

At this time, the tricot permeate channel 300 generally has a structure in the form of a fabric, and serves as a flow path for creating a space through which water purified through the reverse osmosis membrane 200 can flow out.

The tube 400 is positioned at the center of the reverse osmosis filter module, and serves as a passage through which the filtered water is introduced and discharged.

To this end, it is preferred that a pore (or opening) having a predetermined size is formed on the outside of the tube 400 so that filtered water is introduced. At this time, it is preferred that one or more pores are formed so that the filtered water can be introduced more efficiently.

EXAMPLES

Comparative Examples 1 to 4

Comparative Examples 1 to 3 were diamond-shaped feed spacers having a two-layered structure consisting of only a first set and a second set, that satisfied thicknesses, angles formed between the first and second sets (diagonal lines, A and C), SPIs, and thickness ratios between strands, as shown in Table 1 below, respectively.

Figure 4:
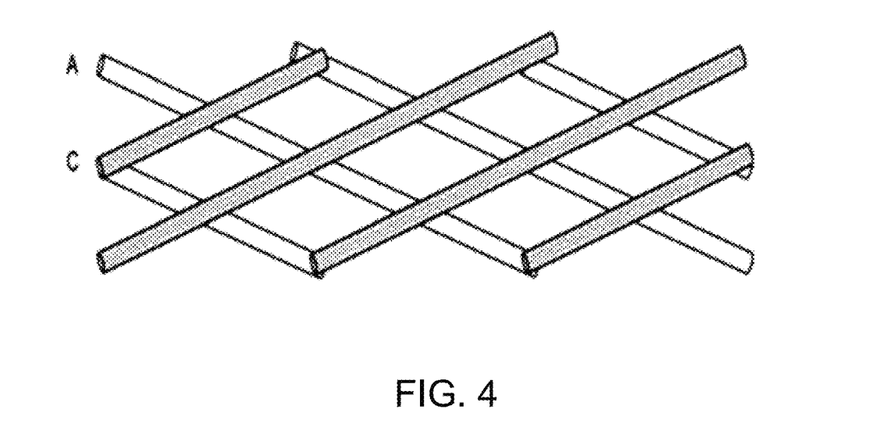
FIGS. 4 to 6 are top views of feed spacers of Comparative Examples 1 to 4 and Examples 1 and 2.

The structures of Comparative Examples 1 to 3 are shown in FIG. 4 below.

Figure 5:
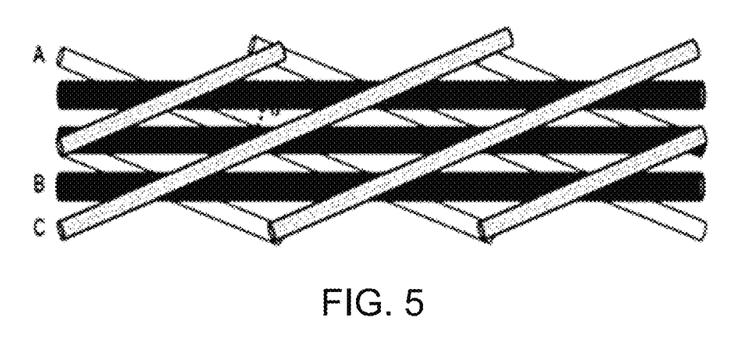
Figure 6:
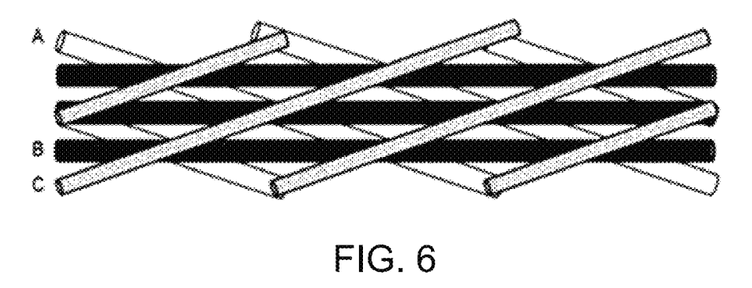

The structure of Comparative Example 4 is shown in FIGS. 5 and 6 below. However, the thickness ratios of the strands were as shown in Table 1 below.

Examples 1 to 3

Examples 1 to 3 were feed spacers having a three-layered structure according to the present invention consisting of a first set and a second set (A and C) and a third set (center line, B), that satisfied thicknesses, angles formed between the first and second sets (diagonal lines, A and C), SPIs, and thickness ratios between strands, as shown in Table 1 below, respectively.

The structures of Examples 1 to 3 were shown in FIGS. 5 and 6 below. At this time, the thickness ratios of the strands were as shown in Table 1 below.

TABLE 1

|  | Thickness (mm) | Angle a (°) | SPI | Thickness ratio of strands | | | ΔP (psi) | Salt removal rate (%) | Flow rate (GPD) |
| --- | --- | --- | --- | --- | --- | --- | --- | --- | --- |
|  |  |  |  | A | B | C |  |  |  |
| Comparative Example 1 | 0.889 | 80 | 5.5 | 1 | NA | 1 | 2.34 | 99.78% | 11,700 |
| Comparative Example 2 | 0.889 | 90 | 5 | 1 | NA | 1 | 2.10 | 99.80% | 11,395 |
| Comparative Example 3 | 0.889 | 65 | 5 | 1 | NA | 1 | 2.06 | 99.77% | 11,426 |
| Comparative Example 4 | 0.889 | 75 | 4.5 | 1 | 1 | 1 | 1.52 | 99.80% | 11,560 |
| Example 1 | 0.889 | 80 | 5 | 1.1 | 1.1 | 1 | 1.43 | 99.80% | 11,523 |
| Example 2 | 0.889 | 80 | 5 | 1 | 1.4 | 1 | 1.32 | 99.77% | 11,600 |
| Example 3 | 0.889 | 75 | 5 | 1 | 0.7 | 1 | 1.52 | 99.77% | 11,800 |

A differential pressure (ΔP (psi)) in Table 1 means a value measured under conditions of a membrane area of 400 ft$^2$, a temperature of 25° C., a pressure of 225 psi, NaCl of 2,000 ppm, and an average flow rate of 44 GPM. More specifically, the differential pressure measured under the average flow rate condition of 44 GPM was obtained using a regression equation based on an individual differential pressure at concentrated water flow rates of 10 GPM to 60 GPM. The average flow rate means an arithmetic mean value of the feed water flow rate and the concentrated water flow rate.

In addition, the salt removal rate and the flow rate in Table 1 mean values measured under the conditions of a temperature of 25° C., a pressure of 225 psi, NaCl of 2,000 ppm, and a recovery rate of 15%.

As used herein, "GPM" is Gallons per Minute and represents a unit of flow rate per minute.

In addition, the thickness, the angle α (°), the SPI, and the thickness ratio of strands in Table 1 were measured by the method described above.

As can be seen from Table 1, when Comparative Examples 1 to 4 and Examples 1 to 3 were compared with each other, it was confirmed that the differential pressure in the Examples was decreased as compared with the differential pressure in the Comparative Examples.

Particularly, even compared with Comparative Example 4 which was a spacer having the three-layered structure, like Examples 1 to 3, in the case where strands of one of the third set and the first set or the second set were thicker than those of the other set with the same spacer having the three-layered structure, it was confirmed that the effect of reducing the differential pressure was greater.

That is, as compared with Comparative Examples 1 to 3, it can be seen that the three-layered structure reduces the pressure generated between the raw water and the feed spacer as compared to the two-layered structure, and as compared with Comparative Example 4, it was confirmed that when the thickness of some strands was greater, the differential pressure effect was greater.

Figure 7:
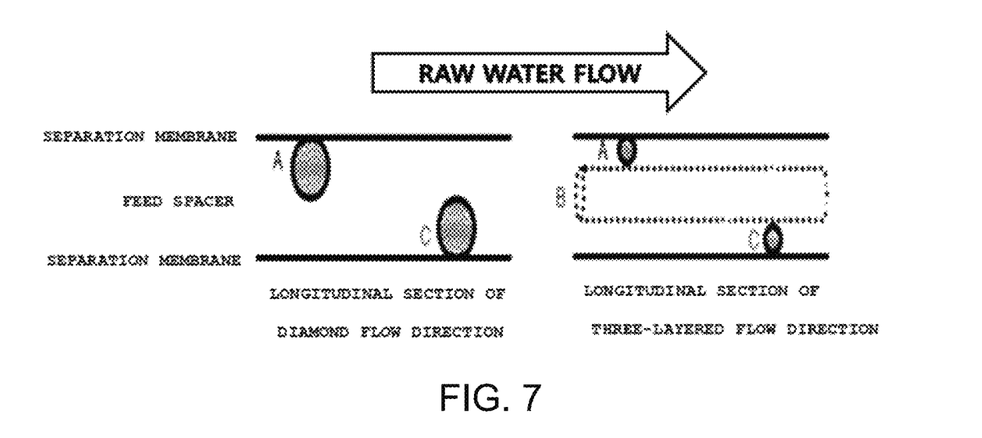
FIG. 7 is a longitudinal section view of a flow direction in the feed spacers of Comparative Examples 1 to 4 and Examples 1 and 2.

In the case of the two-layered diamond-shaped spacers of Comparative Examples 1 to 3, the sum of the thicknesses of the two strands maintains the gap (distance) between the separation membranes, so that the thickness of individual strand becomes about half of the thickness of the feed flow path material. Accordingly, as can be seen in FIG. 7 below, the turbulence in the feed flow also occurs as much as the thickness, and this resistance to turbulence causes the generation of the differential pressure.

On the other hand, in the case of a three-layered spacer, the sum of the thicknesses of the three strands maintains the gap (distance) between the separation membranes, so that the thickness of individual strand becomes about 1/3. In this case, as can be seen in FIG. 7 below, the vicinity of the center line (B) of the three-layered spacer coincided with the flow direction of the feed solution, so that the turbulence occurs less, and the diagonal lines (A and C) above and below the center line impede the flow of raw water.

As a result, the three-layered spacer is eventually reduced in differential pressure.

In addition, in the case of Examples 1 to 3, the thickness of the strand of the center line and/or the thickness of the strand of one diagonal line was thicker than the thickness of the strand of the other diagonal line to lower the flow resistance of the pore solution, and as a result, the differential pressure was more effectively reduced.

In particular, it was confirmed that the case of Example 2 can more effectively reduce the differential pressure.

Hereinabove, the present invention has been described with reference to the preferred embodiments of the present invention, but those skilled in the art will understand that the present invention can be variously modified and changed without departing from the spirit and the scope of the present invention which are defined in the appended claims.

The invention claimed is:

1. A feed spacer having a three-layered structure comprising:
   a first set of a plurality of strands that are positioned parallel;
   a second set of a plurality of parallel strands provided to cross the first set; and
   a third set of a plurality of parallel strands positioned in parallel with a raw water flow direction,
   wherein one of the first set and the second set consists of strands having a thickness smaller than that of the strands constituting the third set, and
   the other set consists of strands having the same thickness as that of the strands constituting the third set,
   wherein a ratio of the thickness of the strands constituting the third set and the thickness of the strands having a thickness smaller than the thickness of the strands constituting the third set is 1.1 to 1.5:1.

2. The feed spacer of claim 1, wherein a strand per inch (SPI) of the feed spacer is 4 to 9.

3. The feed spacer of claim 1, wherein a distance between intersections of the first set and the second set is 3,800 μm to 12,000 μm.

4. The feed spacer of claim 1, wherein an angle formed between the first and second sets is 50° to 90°.

5. The feed spacer of claim 1, wherein the thickness of the feed spacer is 600 μm to 900 μm.

6. A reverse osmosis filter module, comprising the feed spacer having the three-layered structure according to claim 1.

7. The reverse osmosis filter module of claim 6, further comprising:
   a tube including an opening for accommodating a permeate along a longitudinal direction; and
   one or more reverse osmosis membranes configured to extend from the tube in an outer direction and wound around the tube,
   wherein the feed spacer is in contact with the one or more reverse osmosis membranes and wound around the tube.

* * * * *